United States Patent
Mast

(10) Patent No.: US 7,631,615 B1
(45) Date of Patent: Dec. 15, 2009

(54) OXYGENATION SYSTEM FOR FISH FARMING INSTALLATIONS

(75) Inventor: Dennis L. Mast, Apex, NC (US)

(73) Assignee: Shine Holdings, Inc., Raleigh, NC (US)

( * ) Notice: Subject to any disclaimer, the term of this patent is extended or adjusted under 35 U.S.C. 154(b) by 127 days.

(21) Appl. No.: 12/053,928

(22) Filed: Mar. 24, 2008

Related U.S. Application Data

(60) Provisional application No. 60/896,565, filed on Mar. 23, 2007.

(51) Int. Cl.
*A01K 63/04* (2006.01)

(52) U.S. Cl. .................. 119/226; 119/211; 210/747; 210/170.02

(58) Field of Classification Search .......... 119/200, 119/204, 205, 206, 207, 209, 210, 211, 215, 119/217, 218, 226, 227, 231, 234, 236, 243, 119/245; 210/747, 167.26, 170.02, 170.06
See application file for complete search history.

(56) References Cited

U.S. PATENT DOCUMENTS

| | | | | |
|---|---|---|---|---|
| 3,661,262 A | * | 5/1972 | Sanders ................. | 210/167.22 |
| 3,957,017 A | * | 5/1976 | Carmignani et al. ........ | 119/227 |
| 5,227,056 A | * | 7/1993 | Makino ................. | 210/170.06 |
| 6,382,134 B1 | * | 5/2002 | Gruenberg et al. .......... | 119/215 |
| 6,432,312 B1 | * | 8/2002 | Fuss ........................... | 210/668 |
| 6,447,681 B1 | * | 9/2002 | Carlberg et al. ............. | 210/602 |
| 6,722,314 B1 | * | 4/2004 | Crisinel et al. .............. | 119/226 |
| 7,001,519 B2 | * | 2/2006 | Linden et al. ................ | 210/602 |
| 7,052,601 B2 | * | 5/2006 | Gravdal ................... | 210/167.3 |
| 7,306,733 B2 | * | 12/2007 | Olivier ....................... | 210/615 |

* cited by examiner

*Primary Examiner*—T. Nguyen
(74) *Attorney, Agent, or Firm*—Coats & Bennett, P.L.L.C.

(57) ABSTRACT

A process for fish farming includes holding fish within a fish pond and pumping water from the pond. Dividing the pumped water into two streams, a main stream and a secondary stream. Oxygenating the water of the secondary stream by diffusing micro bubbles of oxygen into the water. The method further includes combining the oxygenated water in the secondary stream with the water in the mainstream and returning a substantial portion to the fish pond.

5 Claims, 1 Drawing Sheet

OXYGENATION SYSTEM FOR FISH FARMING INSTALLATIONS

CROSS REFERENCE TO PROVISIONAL APPLICATION

This application claims priority under 35 U.S.C. § 119(e) from the following U.S. provisional application Ser. No. 60/896,565 filed on Mar. 23, 2007. That application is incorporated in its entirety by reference herein.

FIELD OF THE INVENTION

The present invention relates to fish farming and more particularly to providing oxygenation of effluents from fish farming installations.

BACKGROUND

Fish farming entails growing fish in a controlled environment for commercial purposes. Installations in use for this purpose generally include one or more containments for holding fish in water where they can be fed and grow and from which they can be harvested. The containments may include tanks or ponds. Some containments, typically tanks, may be enclosed within buildings.

In order to promote healthy fish growth, the water in the tank or pond must be kept generally clean and suitably oxygenated. Moreover, in cases where water is ejected from fish farming installations into streams or waste water treatment facilities, there is also a concern regarding the levels of biological contamination of the effluent water. Waste products from the fish and uneaten fish food are major sources of biological contamination. Fish consume oxygen to support metabolism, and the decomposition waste and food in the water increases oxygen demand.

Fish farming installations may be of the flow-through type or the closed system type. Flow through installations benefit from sufficient water to allow no recirculation of water back into the containment. For some fish species, flow-through fish culture is desirable. In these types of installations, there is a concern that the water flowing from the fish farming installation does not cause an unacceptable pollution problem downstream due to biological contamination and oxygen depletion.

More common, however, are closed loop type installations, otherwise known as re-circulating aquaculture systems. In closed loop installations, the water is recirculated, often as frequently as one tank volume per hour. Many commercially-important warm-water species thrive in such installations. During re-circulation, the water is filtered to remove biological contaminants and re-oxygenated by aeration or the injection of oxygen gas. Generally, injection of oxygen gas is preferable over aeration because of elevated nitrogen levels that can result when attempting to diffuse sufficient oxygen into the water by using air.

Among the challenges included relative to diffusing oxygen into the water is the problem of oxygen bubbling out of solution to the atmosphere and thus being unavailable to support biological processes in the water, including, of course, fish metabolism as well as degradation of biological contaminants in the water.

SUMMARY OF THE INVENTION

The present invention includes a system for oxygenation of an effluent stream from a fish farming installation. The system includes a divider to divide the effluent into a main flow and a mixing side flow. The system further includes an oxygenator to diffuse oxygen into the mixing side flow and a main mixer to re-mix the side flow with the main flow to produce a oxygenated effluent.

The present invention includes a method of oxygenating fish tank effluent including partitioning the effluent stream into one or more sub-streams, oxygenating one of the partitioned sub-streams using micro bubble oxygenation, and recombining the sub-streams to produce an oxygenated effluent stream.

Other objects and advantages of the present invention will become apparent and obvious from a study of the following description and the accompanying drawings which are merely illustrative of such invention.

DETAILED DESCRIPTION

Figure 1:
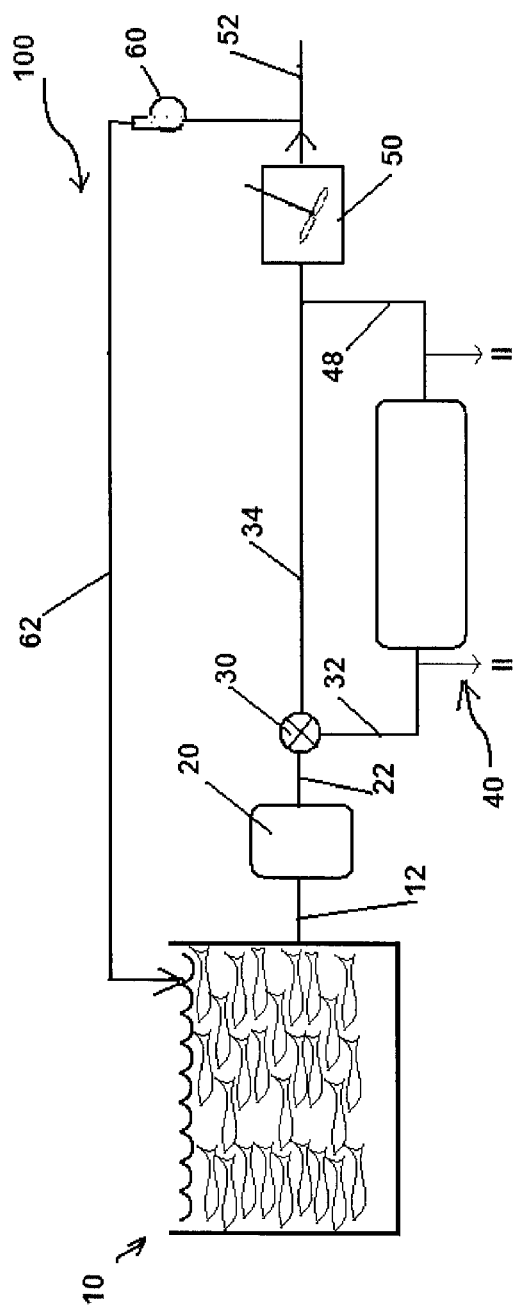
FIG. 1 is a schematic diagram of a fish farming installation with a effluent sub-divided into a main and a mixing flow.

A fish farming facility, indicated generally by the numeral 100 includes a tank 10 holding the fish in water, a filter 20, a flow divider valve 30 and an oxygenator 40 as illustrated in FIG. 1. The system depicted is sometimes referred to as a re-circulating acquaculture system in which cleaned and oxygenated effluent is at least partially recirculated to tank 10. It is appreciated that tank 10 can be replaced by a pond or other form of containment.

Tank 10 is connected to filter 20 by effluent exit line 12. Connector line 22 connects filter 20 with the divider valve 30. Main effluent line 34 and mixing side line 32 connect to divider valve 30. Mixing side line 32 connects to oxygenator 40, thereby connecting the oxygenator to the divider valve. An oxygenator outlet line 48 connects to main effluent line 34 upstream of main mixer 50. A recycle pump 60 connects downstream of main mixer 50 and to a return line 62. Return line 62 connects pump 60 with tank 10. In some embodiments, a portion of the cleaned and oxygenated effluent may be ejected via an eject line 52.

It is appreciated that various systems may be used to inject and diffuse a gas into a liquid flow. Such systems typically inject the gas, producing micro bubbles of the gas in the liquid. These micro bubbles are in the 1-10 micron size range. An example of such a system is disclosed in U.S. Pat. No. 6,284,138, the disclosure of which is expressly incorporated herein by reference. Gas transfer efficiencies generally exceed 60% with gas diffusion energy efficiencies of at least 3 kg/KWH having been measured, especially in oxygen diffusion systems.

Figure 2:
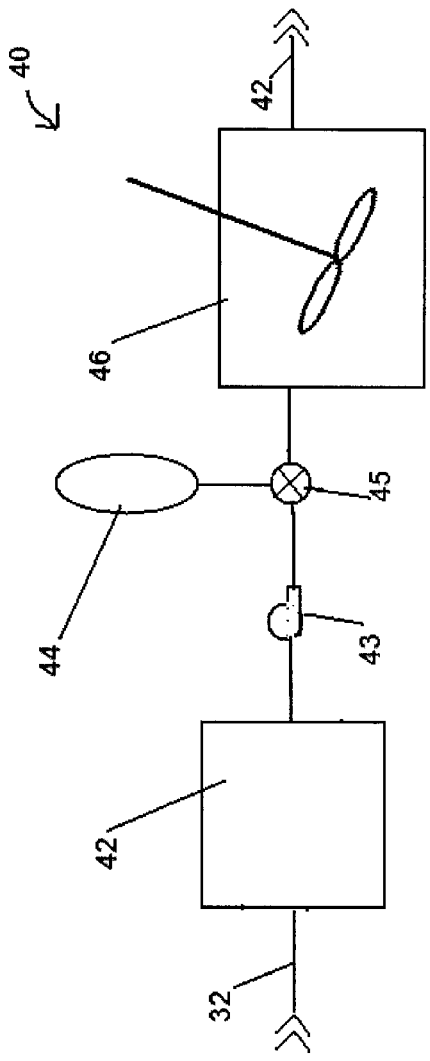
FIG. 2 is a detailed schematic of an oxygenation process applied to the mixing flow.

The present invention discloses a system for diffusing oxygen in the effluent flow from a fish tank or pond in a fish farming installation. In one embodiment the oxygenator comprises a micro bubble oxygenator 40, as shown in FIG. 2. The micro bubble oxygenator includes a holding tank 42, a pump 43, and oxygen supply unit 44, an oxygen injection valve 45, and an oxygenator mixing tank 46. Mixing side line 32 is connected to holding tank 42. Pump 43 connects holding tank 42 to oxygen injection valve 45, which also connects to oxygen supply unit 44. Oxygen injection valve 45 further connects to oxygenator mixing tank 46, and the mixing tank connects to oxygenator outlet line 48.

Oxygen supply unit 44 can take various forms. In one embodiment, oxygen supply unit 44 comprises an oxygen generator coupled with an oxygen storage vessel.

Turning now to the operation of fish farming installation 100, and in particular, to the oxygenation of effluent, it is appreciated that water to be oxygenated flows from tank 10 through effluent exit line 12 and into filter 20. Filter 20 removes contaminants, particularly waste product and uneaten food, from the effluent. Cleaned effluent flows through connector line 22 to divider valve 30 where the effluent is partitioned into a mixing side stream flow of effluent and a main flow of effluent. The main flow of effluent bypasses the micro bubble oxygenator 40 through main effluent line 34 while the mixing side flow enters micro bubble oxygenator 40 through mixing side line 32. Oxygenated side flow of effluent leaves micro bubble oxygenator 40 through oxygenator outlet line 48 and rejoins the main effluent flow in main effluent line 34. The oxygenated side flow and main effluent flow are mixed in mixer 50 to produce an oxygenated effluent. The oxygenated effluent is directed by pump 60 back to tank 10 thereby completing the recycling of the effluent.

The term "fish pond" herein means a body of water that is utilized to farm and raise fish for human consumption.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of fish farming and oxygenating water held within a fish pond that holds fish, comprising:
   a. holding fish within the fish pond;
   b. pumping water from the fish pond and filtering the water;
   c. dividing the water pumped from the fish pond into a mainstream and a secondary stream;
   d. oxygenating the water in the secondary stream by diffusing air into the water in the form of microbubbles having a size range of 1-10 microns; and
   e. after oxygenating the water in the secondary stream, mixing the oxygenated secondary stream with the main stream and returning at least a portion of the mixed main and secondary streams back to the fish pond.

2. The method of fish farming of claim 1 including directing the secondary stream to a holding tank and holding the water of the secondary stream prior to oxygenating the water in the secondary stream; pumping the water of the secondary stream from the holding tank through an oxygen injection valve and injecting oxygen via the oxygen injecting valve into the water of the secondary stream; after injecting the oxygen into the water of the secondary stream, directing the oxygenated water of the second stream to a mixing tank and mixing the water of the second stream.

3. A method of fish farming comprising:
   a. holding fish within a fish pond;
   b. pumping water from the fish pond;
   c. dividing the water pumped from the fish pond into at least two streams;
   d. oxygenating the water in one stream by injecting oxygen into the water and mixing the oxygen with the water; and
   e. after oxygenating the water in one stream, mixing the oxygenated water with the other stream and returning at least a portion of the mixed water to the fish pond.

4. The method of claim 3 including diffusing oxygen into the water by forming microbubbles where the bubbles are 1 to 10 microns in size.

5. The method of claim 3 wherein the water pump from the fish pond is divided into a mainstream and a secondary stream and wherein the secondary stream is directed to a holding tank where the water of the second stream is held; and the method includes pumping the water from the holding tank to an oxygen injection site and injecting oxygen into the water; and after injecting oxygen into the water, transferring the oxygenated water to a mixing tank and mixing the water in the mixing tank.

* * * * *